(12) United States Patent
Tal et al.

(10) Patent No.: US 9,436,394 B2
(45) Date of Patent: Sep. 6, 2016

(54) RAID RANDOM DISTRIBUTION SCHEME

(71) Applicant: Kaminario Technologies Ltd., Yokne'am Ilit (IL)

(72) Inventors: Doron Tal, Haifa (IL); Ilan Steinberg, Haifa (IL); Shai Maskit, Haifa (IL); Eyal Gordon, Haifa (IL)

(73) Assignee: Kaminario Technologies Ltd., Yokne'am Ilit (IL)

( * ) Notice: Subject to any disclaimer, the term of this patent is extended or adjusted under 35 U.S.C. 154(b) by 39 days.

(21) Appl. No.: 14/202,484

(22) Filed: Mar. 10, 2014

(65) Prior Publication Data

US 2015/0254008 A1    Sep. 10, 2015

(51) Int. Cl.
*G06F 12/00*    (2006.01)
*G06F 3/06*    (2006.01)

(52) U.S. Cl.
CPC ............. *G06F 3/0619* (2013.01); *G06F 3/064* (2013.01); *G06F 3/0689* (2013.01)

(58) Field of Classification Search
CPC ... G06F 3/0689; G06F 3/0664; G06F 3/0619
See application file for complete search history.

(56) References Cited

U.S. PATENT DOCUMENTS

| 5,603,001 A * | 2/1997 | Sukegawa | G06F 3/0601 711/103 |
| 2003/0126522 A1 * | 7/2003 | English | G06F 11/1076 714/718 |
| 2005/0114727 A1 * | 5/2005 | Corbett | G06F 11/1076 714/6.21 |

* cited by examiner

*Primary Examiner* — Larry Mackall
(74) *Attorney, Agent, or Firm* — Wiggin and Dana LLP; Gregory S. Rosenblatt; Jonathan D. Hall (57) ABSTRACT

There is provided a computerized method, computerized system, a non-transitory program storage device and a computer program product for enabling allocation of segments in a RAID stripe to respective storage devices in a corresponding RAID group. A randomized distribution scheme is generated for randomly distributing the data segments and syndrome segments in a RAID stripe to respective storage devices in the RAID group. The randomized distribution scheme is used for distributing the segments in the at least one RAID stripe to the storage devices in the RAID group, such that any two failed storage devices in the RAID group would have the same first probability (P) for being protected by the same type-1 syndrome segment and the same second probability (1-P) for each one of the two failed storage devices being protected by a different type-1 syndrome segment, irrespective of the relative location of the two failed storage devices.

14 Claims, 4 Drawing Sheets

Fig. 1

| 1 | 2 | 3 | 4 | 5 | 6 | 7 | 8 | 9 | 10 | 11 |
|---|---|---|---|---|---|---|---|---|----|----|
| D1 | D2 | D3 | D4 | P1 | D5 | D6 | D7 | D8 | P2 | Q |
| Q | D1 | D2 | D3 | D4 | P1 | D5 | D6 | D7 | D8 | P2 |
| P2 | Q | D1 | D2 | D3 | D4 | P1 | D5 | D6 | D7 | D8 |
| D8 | P2 | Q | D1 | D2 | D3 | D4 | P1 | D5 | D6 | D7 |
| D7 | D8 | P2 | Q | D1 | D2 | D3 | D4 | P1 | D5 | D6 |
| D6 | D7 | D8 | P2 | Q | D1 | D2 | D3 | D4 | P1 | D5 |
| D5 | D6 | D7 | D8 | P2 | Q | D1 | D2 | D3 | D4 | P1 |
| P1 | D5 | D6 | D7 | D8 | P2 | Q | D1 | D2 | D3 | D4 |
| D4 | P1 | D5 | D6 | D7 | D8 | P2 | Q | D1 | D2 | D3 |
| D3 | D4 | P1 | D5 | D6 | D7 | D8 | P2 | Q | D1 | D2 |

Fig. 2

| 1 | 2 | 3 | 4 | 5 | 6 | 7 | 8 | 9 | 10 | 11 |
|---|---|---|---|---|---|---|---|---|----|----|
| D2 | D3 | D1 | D5 | Q | P2 | D7 | D8 | D4 | D6 | P1 |
| D8 | D5 | D2 | D1 | P2 | D3 | D6 | P1 | Q | D7 | D4 |
| D3 | D4 | D7 | P2 | Q | D2 | D1 | D5 | D6 | D8 | P1 |
| P2 | D7 | P1 | D1 | Q | D6 | D4 | D5 | D3 | D8 | D2 |
| D7 | D6 | Q | P1 | D5 | D4 | D3 | D2 | D8 | P2 | D1 |
| P2 | Q | P1 | D1 | D5 | D7 | D8 | D3 | D2 | D6 | D4 |
| D3 | D7 | Q | P1 | D1 | P2 | D2 | D8 | D5 | D4 | P6 |
| D6 | D1 | D5 | D7 | P1 | D2 | P2 | D3 | D4 | D8 | Q |
| D8 | D2 | D4 | P1 | D7 | D1 | D5 | Q | D6 | D3 | P2 |
| P2 | D2 | D5 | D6 | D1 | D8 | D4 | P1 | D3 | Q | D7 |

RAID RANDOM DISTRIBUTION SCHEME

FIELD OF THE DISCLOSURE

This invention relates to the field of RAID storage systems.

BACKGROUND OF THE DISCLOSURE

RAID (Redundant Array of Independent Disks) is a storage technology that combines a set of storage devices into a single logical storage unit for the purpose of providing improved storage fault tolerance and enhanced performance. Data and redundancy information are distributed over a group of storage devices (RAID group), to allow reconstruction of lost data in the event of storage device failure. Distribution of data and redundancy information across the RAID group storage devices is made in one of several protection schemes referred to as "RAID levels". A preferred RAID level is selected depending on the required level of redundancy, performance, and space utilization.

Under common RAID schemes, each storage devices is partitioned into equal size segments. A set of segments which span some or all of the storage devices (but no more than a segment per storage devices) constitute a "RAID stripe". Depending on the specific RAID level which is implemented, each such stripe consists of one or more data segments, and a given number of syndromes (otherwise known as "parity") segments. Furthermore, the syndrome segments, which are written to in an equal-to or higher frequency than the data segments (depending on the RAID level), are commonly distributed in an even manner across the system storage devices, to facilitate load balancing amongst the system storage devices.

Level 6 RAID enables continuous execution of read and write operations in the event of up to two concurrent storage device failures. RAID 6 is implemented by computing two syndromes (typically referred to as p and q) segments for N data segments in each RAID stripe. This first syndrome segment (p) is commonly computed by a simple XOR operation on the data segments across the stripes. The second syndrome segment (q), requires more complicated computation based on field theory.

BRIEF SUMMARY OF THE DISCLOSURE

According to one aspect of the presently disclosed subject matter there is provided a computerized method of allocating segments in a RAID stripe to respective storage devices in a corresponding RAID group; each RAID stripe comprises a group of data segments arranged in a first subset of data segments and a second subset of data segments; the first subset is protected by a first type-1 syndrome segment, the second subset is protected by a second type-1 syndrome segment and the entire group of data segments is protected by a type-2 syndrome segment; the method comprising using a processor for:

generating a randomized distribution scheme for randomly distributing the data segments and syndrome segments in a RAID stripe to respective storage devices in the RAID group; and responsive to a need to write data to the RAID group:

generating at least one RAID stripe; and using the randomized distribution scheme for distributing the segments in the at least one RAID stripe to the storage devices in the RAID group, such that any two failed storage devices in the RAID group would have the same first probability (P) for being protected by the same type-1 syndrome segment and the same second probability (1-P) for each one or the two failed storage devices being protected by a different type-1 syndrome segment, irrespective of the relative location of the two failed storage devices.

In addition to the above features, the method according to this aspect of the presently disclosed subject matter can optionally comprise one or more of features (i) to (vi) below, in any desired combination or permutation.

i. Wherein the computerized method further comprises: responsive to a need to read data from the RAID group, using the randomized distribution scheme for reconstructing segments in the at least one RAID stripe.

ii. wherein generating the randomized distribution scheme comprises:

generating a randomization table, wherein each row in the randomization table comprises a sequence of integers in random order, the sequence of integers in each row representing one possible randomized distribution of segments in a RAID stripe across storage devices in the RAID group;

selecting a row from the randomization table; and distributing the segments in the RAID stripe to the storage devices in the RAID group based on a respective sequence of integers in the selected row.

iii. wherein selection of a row from the randomization table comprises:

performing a modulo (%) operation between the sequence number of the RAID stripe to which the data is being written and a total number of rows in the randomization table.

iv. wherein each integer value in the selected row represents a respective data segment or syndrome segment in the RAID stripe and each location in the selected row cell represents a specific storage device in the RAID group.

v. wherein random distribution of the segments to storage device in the RAID group is logically represented in a table stored in computer memory.

vi. wherein the generation of the randomization table comprises:

generating a table comprising n columns and m rows; wherein n equals to the number of segments in a RAID stripe an wherein m is equal or smaller than the number of RAID stripes in the RAID group;

generating for each row a randomly ordered sequence of integers; and storing the randomly ordered sequence of integers in the row.

According to another aspect of the presently disclosed subject matter there is provided a storage system comprising a control interface configured to logically represent a storage space constituted by a plurality of storage devices as at least one RAID group configured for storing a plurality of RAID stripes; each RAID stripe comprises a group of data segments arranged in a first subset of data segments and a second subset of data segments; the first subset is protected by a first type-1 syndrome segment, the second subset is protected by a second type-1 syndrome segment and the entire group of data segments is protected by a type-2 syndrome segment; the control layer comprises a RAID controller configured to:

generate a randomized distribution scheme for randomly distributing the data segments and syndrome segments in a RAID stripe to respective storage devices in the RAID group; and, responsive to a need to write data to the RAID group, to: generate at least one RAID stripe; and utilize the randomized distribution scheme for distributing the segments in the at least one RAID stripe to the storage devices in the RAID group, such that any two failed storage devices in the RAID group would have the same first probability (P) for being protected by the same type-1 syndrome segment and the same second probability (1-P) for each one of the two failed storage devices being protected by a different type-1 syndrome segment, irrespective of the relative location of the two failed storage devices.

In addition to the above features, the system according to this aspect of the presently disclosed subject matter can optionally comprise one or more of features (i) to (vii) listed below, in any desired combination or permutation:

i. wherein the RAID controller is further configured, responsive to a need to read data from the RAID group, to utilize the randomized distribution scheme for reconstructing segments in the at least one RAID stripe.

ii. wherein the RAID controller is configured for generating the randomized distribution scheme to:
generate a randomization table, wherein each row in the randomization table comprises a sequence of integers in random order, the sequence of integers in each row representing one possible randomized distribution of segments in a RAID stripe across storage devices in the RAID group; select a row from the randomization table; and distribute the segments in the RAID stripe to the storage devices in the RAID group based on a respective sequence of integers in the selected row.

iii. wherein the RAID controller is configured to select a row from the randomization table to perform a modulo (%) operation between a sequential number of the RAID stripe to which the data is being written and a total number of rows in the randomization table.

iv. wherein the RAID controller is configured to assign each integer value in the selected row to a respective data segment or syndrome segment in the RAID stripe and assign each location in the selected row cell to a specific storage device in the RAID group.

v. wherein the RAID controller is configured to manage a table logically representing the random distribution of the segments to storage device in the RAID group; the table being stored in a computer memory.

vi. wherein the RAID controller is configured for generating the randomization table to:
generate a table comprising n columns and m rows; wherein n equals to the number of segments in a RAID stripe and wherein m is equal or smaller than the number of RAID stripes in the RAID group;
generate for each row a randomly ordered sequence of integers; and
store the randomly ordered sequence of integers in the row.

vii. wherein the storage system is a Solid State Device.

According to another aspect of the presently disclosed subject matter there is provided a non-transitory program storage device readable by a computer, tangibly embodying a computer readable code portion executable by the computer to perform a method of allocating segments in a RAID stripe to respective storage devices in a corresponding RAID group; each RAID stripe comprises a group of data segments arranged in a first subset of data segments and a second subset of data segments; the first subset is protected by a first type-1 syndrome segment, the second subset is protected by a second type-1 syndrome segment and the entire group of data segments is protected by a type-2 syndrome segment; the method comprising:
generating a randomized distribution scheme for randomly distributing the data segments and syndrome segments in a RAID stripe to respective storage devices in the RAID group; and, responsive to a need to write data to the RAID group:
generating at least one RAID stripe; and using the randomized distribution scheme for distributing the segments in at least one RAID stripe to the storage devices in the RAID group, such that any two failed storage devices in the RAID group would have the same first probability (P) for being protected by the same type-1 syndrome segment and the same second probability (1-P) for each one of the two failed storage devices being protected by a different type-1 syndrome segment, irrespective of the relative location of the two failed storage devices.

A computer program product comprising a non-transitory computer useable medium having computer readable program code embodied therein of allocating segments in a RAID stripe to respective storage devices in a corresponding RAID group, the computer program product comprising:
computer readable program code for causing the computer to generate a randomized distribution scheme for randomly distributing the data segments and syndrome segments in a RAID stripe to respective storage devices in the RAID group;
computer readable program code for causing the computer, responsive to a need to write data to the RAID group to:
generate at least one RAID stripe;
utilize the randomized distribution scheme for distributing the segments in the at least one RAID stripe to the storage devices in the RAID group, such that any two failed storage devices in the RAID group would have the same first probability (P) for being protected by the same type-1 syndrome segment and the same second probability (1-P) for each one of the two failed storage devices being protected by a different type-1 syndrome segment, irrespective of the relative location of the two failed storage devices.

The computer storage device and computer program product disclosed herein can optionally further comprise one or more of features (i) to (vi) listed above, mutatis mutandis, in any desired combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

Elements in the drawings are not necessarily drawn to scale.

DETAILED DESCRIPTION

Unless specifically stated otherwise, as apparent from the following discussions, it is appreciated that throughout the specification discussions utilizing terms such as "generating", "using", "utilizing", "selecting", "distributing", "allocating" or the like, include actions and/or processes of a computer that manipulate and/or transform data into other data, said data represented as physical quantities, e.g. such as electronic quantities, and/or said data representing the physical objects.

Interface layer 110 described below comprises or is otherwise operatively coupled to at least one computer processor. The term "computer", "computer processor", "processor", "controller" or the like should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

Figure 1:
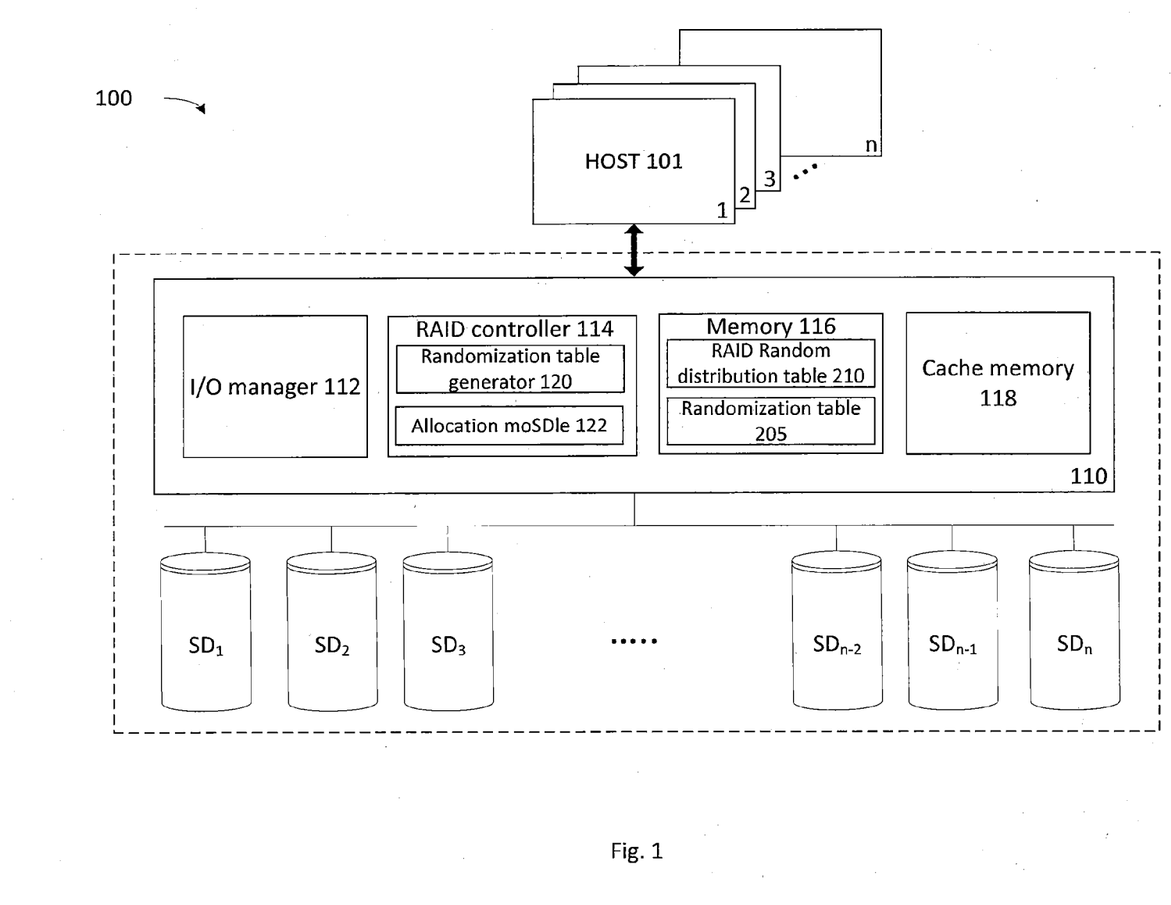
FIG. 1 is a functional block diagram schematically illustrating a storage system, in accordance with the presently disclosed subject matter.
Figure 4:
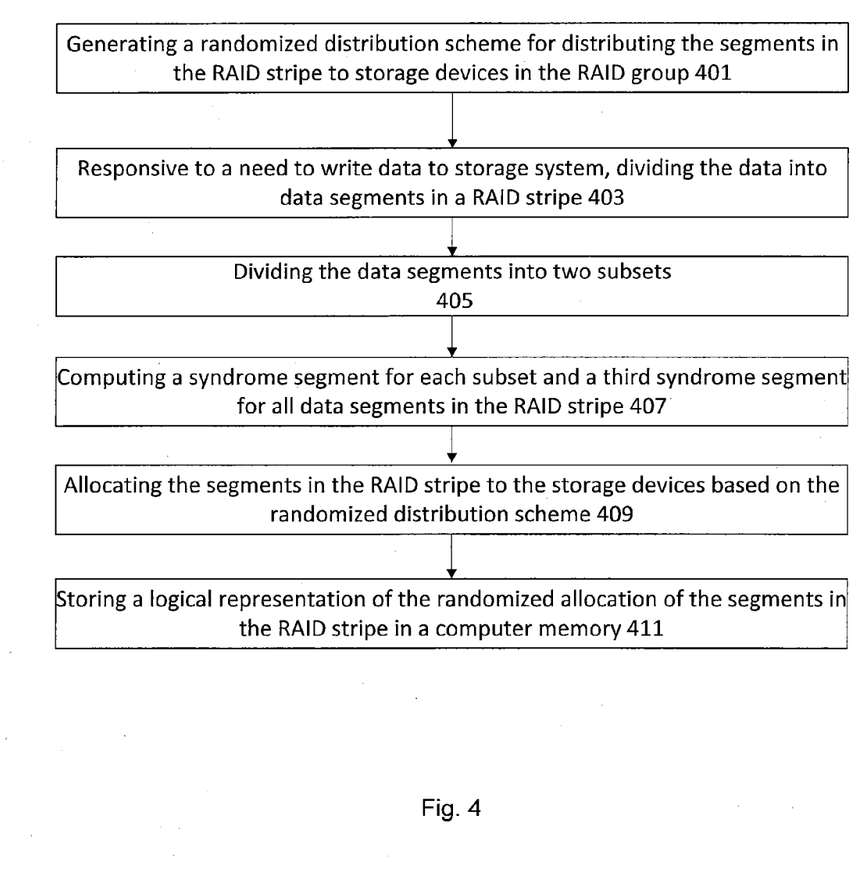
FIG. 4 is a flowchart showing an example of a sequence of operations performed, in accordance with the presently disclosed subject matter.

In embodiments of the presently disclosed subject matter, fewer, more and/or different stages than those shown in FIG. 4 may be executed. In embodiments of the presently disclosed subject matter one or more stages illustrated in FIG. 4 may be executed in a different order and/or one or more groups of stages may be executed simultaneously. FIG. 1 illustrates a general schematic of the system architecture in accordance with an embodiment of the presently disclosed subject matter. Modules in FIG. 1 can be made up of a combination of software, hardware and/or firmware that performs the functions as defined and explained herein. Modules in FIG. 1 may be centralized in one location or dispersed over more than one location. In other embodiments of the presently disclosed subject matter, the system may comprise fewer, more, and/or different elements than those shown in FIG. 1.

Bearing this in mind, attention is drawn to FIG. 1 illustrating a functional block diagram of a storage system, according to the presently disclosed subject matter. Storage system 100 comprises a physical storage space with one or more storage devices ($SD_{1-n}$). Storage devices may be any one of Hard Storage devices (HDD) or Solid State Drives (SSD, comprising for example, a plurality of NAND elements) or any other appropriate storage device.

In the following discussion, the term "storage device" is used for describing any type of computer storage elements constituting a RAID stripe group, where different RAID stripe segments are distributed across different storage devices. It is noted that this term is used by way of non-limiting example only, and the presently disclosed subject matter contemplates any type of computer storage element which is configured for storing RAID group elements, including for example, a hard storage device, a solid state drive, or disk.

Storage system 100 further comprises a control interface 110 comprising various control devices operatively connected to the physical storage space and to one or more hosts, and configured to control interface operations (including I/O operations) in the storage system. Control devices in control interface 110 as well as the storage device in the physical storage space can be consolidated in a single unit, or can be otherwise distributed over one or more computer nodes connected across a computer network.

Control interface 110 can be further configured to provide a virtual storage layer logically representing the storage space as well as the required mapping between the physical storage space and the respective logical representation.

Control interface 110 can comprise, for example, I/O manager 112 and RAID controller 114. I/O manager 112 is configured to handle I/O (input, output) requests received, for example from hosts $101_{1 \ldots n}$.

RAID controller 114 is configured for managing a RAID protection scheme, including, inter alia, distribution of data into RAID stripe data segments, syndrome segments calculation, distribution of data segments and syndrome segments over the storage devices, rebuild operations, etc.

Control interface can further comprise memory 116 and cache memory 118. Memory 116 can include transitory and non-transitory computer memory. Memory 116 can be utilized for storing information needed for mapping between the physical storage space and the respective logical representation as mentioned above. For example, RAID distribution tables logically representing distribution of data and syndrome segments to storage devices can be stored in memory 116. Cache memory 118 can be utilized for example, by RAID controller 114 during syndrome segments computation and RAID stripe generation.

According to the presently disclosed subject matter, RAID control 114 is configured to implement a RAID protection scheme comprising three syndrome segments, referred to herein as a "RAID TREE". Unlike RAID 6, where both p syndrome and q syndrome are calculated over all the data segments in a given RAID stripe, in a RAID TREE protection scheme, two individual p syndromes and one q syndrome are computed for each stripe.

Each set of data segments in a given RAID TREE stripe is divided into two subsets. Each subset is protected by a dedicated "type-1" (or p) syndrome segment in the stripe, (implemented for example by a XOR of the data segments, as used in the RAID-4 and RAID-5 schemes).

In addition, the entire set of data segments (the union of both subsets) is protected by a "type-2" (or q) syndrome segment within the stripe. Computationally, "type-2" syndrome can be the same syndrome which is used as the second syndrome in standard RAID 6 protection schemes, in addition to a XOR of the data segments.

The two independent syndromes, which protect each data segment, protect each stripe from data loss when up to two segments are lost due to storage device failure. This property is provided also by a standard RAID 6 protection level.

Unlike RAID 6, the RAID TREE scheme provides that, in the event of a single storage device failure, while serving reads from the failed storage device, before it has been recovered, only half of the data segments need to be read in order to calculate the lost data.

Following storage device failure, for each RAID stripe, RAID controller 114 can be configured to execute a RAID rebuild operation during which data segments and/or syndrome segments are reconstructed, and the stripe is reconfigured by overwriting some of the non-failed segments in the stripe. The reconfigured stripe has one less redundancy segment, while maintaining the property that each data segment is protected by two independent parities. Therefore, the stripe continues to be protected from data loss when up to two (additional) data segments are lost due to storage device failures. The rebuild and reconfiguration of a stripe following a single storage device failure results in a RAID 6 format stripe. As in RAID 6, a single type-1 syndrome segment protects all the data segments of the stripe (no division into two subsets), and a type-2 syndrome continues to protect all the data segments of the stripe.

Following two storage device failures, RAID controller 114 is configured to rebuild and reconfigure each RAID stripe to a RAID 5 protection scheme, where a single parity protection protects all the data segments of the stripe. Although RAID 5 has one less protection level than the original configuration, it still has a redundancy segment which provides protection. This has a better protection level, than if the stripe had been initially configured as a RAID 6 configuration, which would leave the stripe without any redundancy segments.

In an existing RAID 6 configuration, a common RAID distribution scheme for assigning data segments and syndrome segments of the various stripes is normally done in what is known as row diagonal parity. For example, in a configuration of N storage devices in stripe X, the type-1 parity coding is on storage device X % N, and the type-2 parity is on storage device (X+1) % N.

Figure 2:
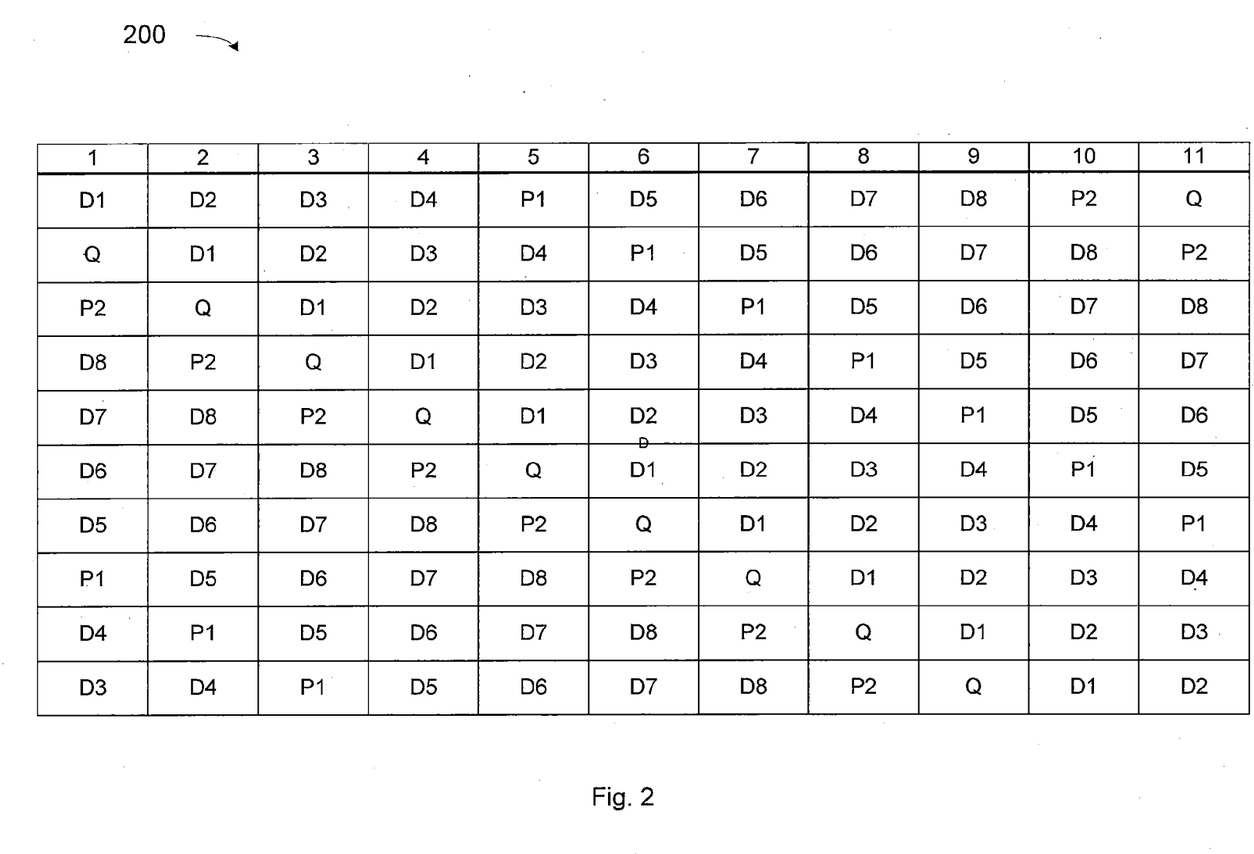
FIG. 2 is a schematic example of a RAID distribution table logically representing distribution of segments across storage devices, as known in the art.

FIG. 2 shows a schematic example of a distribution table used for logically representing the distribution of data and syndrome segments across storage devices in a RAID group. Each row in table 200 represents a respective RAID stripe and each column represents a respective storage device. According to the example in FIG. 2, each RAID stripe comprises 8 data segments, wherein p1 syndrome is computed for the first 4 data segments (D1-D4), p2 syndrome is computed for the next 4 data segments (D5-D8) and q syndrome is computed for the entire set of data segments in the stripe.

As mentioned above, RAID controller 114 can be configured to manage RAID distribution table 200. For example, responsive to a received write request, RAID controller 114 can be configured to compute the syndrome segments, generate a respective RAID stripe and allocate the data segments and syndrome segments in the RAID stripe to respective storage devices in the RAID group based on the above RAID distribution scheme, as exemplified in table 200. Furthermore, reconfigurations made to a RAID group are reflected in updates which are made to the distribution table.

Using the above distribution scheme with protection schemes other than the RAID TREE can be advantageous. For example, one advantage of the above RAID distribution scheme is that since syndrome segments of different RAID stripes are allocated to different storage devices, contention over the syndrome segments can be avoided. Furthermore, in the event of a storage device failure, even performance degradation can be ensured. Otherwise, if a storage device containing only syndrome segments fails, there would be no degradation at all, while a storage device containing only data segments, would require a rebuild operation on every read.

However, this type of RAID distribution scheme would not achieve even degradation in cases where a RAID TREE protection scheme is used, as explained above. Rather, the degradation in such cases is divided into two extreme situations, a low degradation scenario, and a high degradation scenario. At one extreme, if two concurrently failed storage devices happen to be adjacent ($D_i$, $D_{i+1}$), high degradation is encountered. In such a case, most stripes in a RAID group end up being protected by the same type-1 syndrome segment (p1 or p2), and thus each read, from any of these storage devices, requires to read all segments, and to use the type-2 syndrome computation.

At the other extreme, if two concurrently failed storage device happen to be located far apart (non-adjacent), low degradation is encountered. In such cases, most stripes in a RAID group end up being protected by a different type-1 parity redundancy segment, and thus, each read would require reading half the storage devices, and the use of one type-1 parity redundancy segment.

Providing a storage system with uneven degradation, which is dependent on the relative location of the two failing storage devices, is undesirable, because of the unpredictability of extreme degradation, and the fact that it portrays the storage system as a highly degradable system.

Thus, according to the presently disclosed subject matter, a new RAID distribution scheme is presented, which overcomes the shortcomings of the distribution scheme described above. According to the proposed RAID distribution scheme, the segments in a RAID stripe are randomly distributed over the storage devices in the RAID group.

Figure 3:
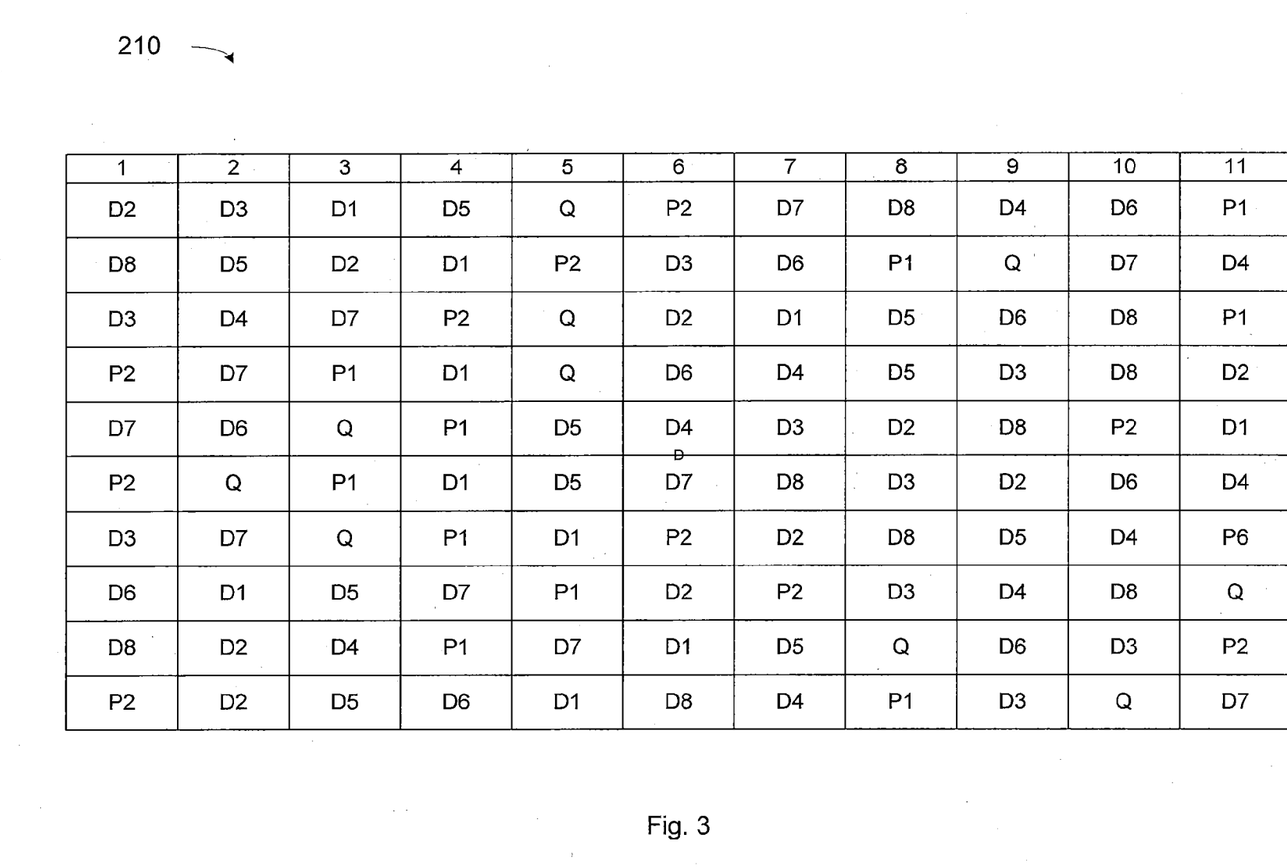
FIG. 3 is a schematic example of a RAID distribution table logically representing random distribution of segments across storage devices, in accordance with the presently disclosed subject matter.

To this end, RAID controller 114 can be configured to use a randomized distribution scheme for randomly distributing data segments and syndrome segments across the storage devices. FIG. 3 schematically illustrates an example of a RAID distribution table 210 logically representing random distribution of segments across storage devices, in accordance with the presently disclosed subject matter. FIG. 3 shows the randomized distribution of the segments of the RAID stripes which are shown earlier with reference to FIG. 2.

A randomized distribution scheme can be implemented for example, with the help of randomization table 205. The randomization table comprises N columns, N being the total number of segments in a RAID stripe. The number of rows in the randomization table is equal to, or lower than, the actual number of stripes in the RAID group.

RAID controller 114 can comprise or be accessible to randomization table generator 120 configured to generate randomization table 205. Randomization table 205 can be stored in computer memory 116. Randomization table generator 120 can be configured to generate, for each row i in the randomization table a randomly ordered sequence of integers (e.g. using pseudo random function). The integer values in the sequence may run for example, from 1 to N. The integers in the generated sequence are inserted into respective cells in row i.

According to one example, each integer value in the randomized sequence can represent a specific data segment or syndrome segment in the RAID stripe. Each location in the randomized sequence (or respective cell in the randomization table) can represent a specific storage device in the RAID group storage devices array. Each one of i rows in randomization table 205 represents a possible randomized distribution of segments in a RAID stripe across storage devices in a RAID group.

Responsive to a need to write data to the storage system, RAID controller 114 can be configured to divide the data into data segments in a RAID stripe and calculate the three syndrome segments of a RAID TREE protection scheme, as explained above. Once the RAID stripe is ready, RAID controller 114 can be configured to select a row in randomization table 205 and to allocate the segments in the RAID stripe to respective storage devices in the RAID group, based on the information in the selected row.

According to one example, the row in the randomization table is selected by performing a modulo (%) operation between the RAID stripe number (e.g. a serial number of the stripe in the RAID group) to which the data is being written in the current write operation, and the total number of rows in randomization table 205. The same row selection method is used during read operations in order to reconstruct the data correctly.

Assuming for example, randomization table 205 comprises 1000 rows and the current write operation is directed to RAID stripe number 3007 in the RAID group, the row in the randomization table is selected by: 3007% 1000=7. In this case, the randomized sequence of integers which appears in row 7 in randomization table 205 is used by RAID controller 114 for randomly allocating the segments in the RAID-stripe.

For example, assuming row 7 was selected for distributing the segments in the RAID stripe logically represented by the bottom row of table 210 in FIG. 3, and further assuming row 7 in randomization table 205 comprises the following sequence of integers: 10 2 6 7 1 9 4 5 3 11 8, the following allocation of segments is made:

syndrome segment p2 (represented by the value 10) is allocated to Storage device 1; data segment D2 (represented by the value 2) is allocated to Storage device 2; data segment D5 (represented by the value 6) is allocated to Storage device 3; data segment D6 (represented by the value 7) is allocated to storage device 4; data segment D1 (represented by the value 1) is allocated to Storage device 5; data segment D8 (represented by the value 9) is allocated to Storage device 6; data segment D4 (represented by the value 4) is allocated to Storage device 7; syndrome segment p1 (represented by the value 5) is allocated to Storage device 8; data segment D3 (represented by the value 3) is allocated to Storage device 9; syndrome segment q (represented by the value 11) is allocated to Storage device 10; and data segment D7 (represented by the value 8) is allocated to Storage device 11.

Given a large enough number of RAID stripes in a RAID group (for example greater than 1000 segments) a randomized distribution scheme, as disclosed herein, ensures that any two failed storage devices in a given RAID group would have the same first probability (P) for being protected by the same type-1 syndrome segment and the same second probability (1-P) for each one of the two failed storage devices being protected by a different type-1 syndrome segment, irrespective of the relative location of the two failed storage devices. Notably, the first probability (P) and the second probability (1-P) are not necessarily equal. In this way, randomized distribution helps to maintain even degradation of the storage system.

RAID controller 114 can further comprise allocation module 122 configured to allocate the segments in the RAID stripe to the respective storage devices in the RAID group, based on the selected row in the randomization table. RAID controller 114 can be further configured to manage a random distribution table 210 used for logically representing the random distribution of data and syndrome segments across storage devices in a RAID group.

FIG. 4 is a flowchart showing an example of a sequence of operations which can be executed, in accordance with the presently disclosed subject matter. Operations described with reference to FIG. 4 can be executed for example, by RAID controller 114 described above.

A randomized distribution scheme for distributing the segments in the RAID stripe to storage devices in the RAID group is generated (block 401). As explained above, a randomized distribution scheme can be generated for example, by generating a randomization table. Each row in the randomization table comprises a sequence of integers in random order. The sequence of integers in each row represents one possible randomized distribution of segments in a RAID stripe across storage devices in a RAID group.

Responsive to a need to write data (e.g. responsive to a write request received from a host) to the storage system, the data is divided into data segments of a RAID stripe (block 403). The entire data segments in the RAID stripe are divided into two subsets of data segments (block 405). A first, type-1 syndrome is computed for protecting the data segments in the first subset, a second type-1 syndrome is computed for protecting the data segments in the second subset and a type-2 syndrome is computed for protecting all segments in the RAID stripe (block 407).

The segments in the RAID stripe are then allocated to their respective storage devices in the RAID group, based on the randomized distribution scheme (block 409). As explained above, a row can be selected from the randomization table, using some predefined selection method, and the segments in the RAID stripe are allocated to respective storage devices in the RAID group based on the randomized order of the integers in the selected row. In a reading operation directed to a given stripe, the same randomization used for writing the stripe is used for reconstructing the data.

A logical representation of the randomized distribution of the segments in the RAID stripe can be stored in a RAID distribution table in the computer memory (block 411). As mentioned above, the RAID distribution table serves for mapping between the data segments and syndrome segments in each RAID stripe and the respective storage devices in the physical storage to which the segments are allocated.

It is to be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

The term "non-transitory" is used herein to exclude transitory, propagating signals, but to otherwise include any volatile or non-volatile computer memory technology suitable to the application.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

What is claimed:

1. A computerized method of allocating segments in a RAID stripe to respective storage devices in a corresponding RAID group; each RAID stripe comprises a group of data segments arranged in a first subset of data segments and a second subset of data segments; the first subset is protected by a first type-1 syndrome segment, the second subset is protected by a second type-1 syndrome segment and the entire group of data segments is protected by a type-2 syndrome segment; the method comprising using a processor for:

generating a randomized distribution scheme for randomly distributing the data segments and syndrome segments in a RAID stripe to respective storage devices in the RAID group, including:
generating a randomization table, wherein each row in the randomization table comprises a sequence of integers in random order, the sequence of integers in each row representing one possible randomized distribution of segments in a RAID stripe across storage devices in the RAID group,
selecting a row from the randomization table, and
distributing the segments in the RAID stripe to the storage devices in the RAID group based on a respective sequence of integers in the selected row; and responsive to a need to write data to the RAID group:
generating at least one RAID stripe; and using the randomized distribution scheme for distributing the segments in the at least one RAID stripe to the storage devices in the RAID group, such that any two failed storage devices in the RAID group would have the same first probability (P) for being protected by the same type-1 syndrome segment and the same second probability (1-P) for each one of the two failed storage devices being protected by a different type-1 syndrome segment, irrespective of the relative location of the two failed storage devices.

2. The computerized method according to claim 1 further comprising:
responsive to a need to read data from the RAID group, using the randomized distribution scheme for reconstructing segments in the at least one RAID stripe.

3. The computerized method according to claim 1 wherein selection of a row from the randomization table comprises:
performing a modulo (%) operation between a number of the RAID stripe to which the data is being written, and a total number of rows in the randomization table.

4. The computerized method according to claim 1 wherein each integer value in the selected row represents a respective data segment or syndrome segment in the RAID stripe and each location in the selected row cell represents a specific storage device in the RAID group.

5. The computerized method according to claim 1 wherein random distribution of the segments to storage devices in the RAID group is logically represented in a table stored in a computer memory.

6. The computerized method according to claim 1 wherein the generation of the randomization table comprises:
generating a table comprising n columns and m rows; wherein n equals to the number of segments in a RAID stripe an wherein m is equal to or smaller than the number of RAID stripes in the RAID group;
generating, for each row, a randomly ordered sequence of integers; and
storing the randomly ordered sequence of integers in the row.

7. A storage system comprising a control interface configured to logically represent a storage space constituted by a plurality of storage devices as at least one RAID group configured for storing a plurality of RAID stripes; each RAID stripe comprises a group of data segments arranged in a first subset of data segments and a second subset of data segments; the first subset is protected by a first type-1 syndrome segment, the second subset is protected by a second type-1 syndrome segment and the entire group of data segments is protected by a type-2 syndrome segment; a control layer comprises a RAID controller configured to:

generate a randomized distribution scheme for randomly distributing the data segments and syndrome segments in a RAID stripe to respective storage devices in the RAID group; and, responsive to a need to write data to the RAID group, to: generate at least one RAID stripe; and utilize the randomized distribution scheme for distributing the segments in the at least one RAID stripe to the storage devices in the RAID group, such that such any two failed storage devices in the RAID group would have the same first probability (P) for being protected by the same type-1 syndrome segment and the same second probability (1-P) for each one of the two failed storage devices being protected by a different type-1 syndrome segment, irrespective of the relative location of the two failed storage devices;

wherein the RAID controller is configured for generating the randomized distribution scheme to:
generate a randomization table, wherein each row in the randomization table comprises a sequence of integers in random order, the sequence of integers in each row representing one possible randomized distribution of segments in a RAID stripe across storage devices in the RAID group; select a row from the randomization table; and distribute the segments in the RAID stripe to the storage devices in the RAID group based on a respective sequence of integers in the selected row.

8. The storage system according to claim 7 wherein the RAID controller is further configured, responsive to a need to read data from the RAID group, to utilize the randomized distribution scheme for reconstructing segments in the at least one RAID stripe.

9. The storage system according to claim 8 wherein the RAID controller is configured to select a row from the randomization table to perform a modulo (%) operation between a number of the RAID stripe to which the data is being written and a total number of rows in the randomization table.

10. The storage system according to claim 7 wherein the RAID controller is configured to assign each integer value in the selected row to a respective data segment or syndrome segment in the RAID stripe and assign each location in the selected row cell to a specific storage device in the RAID group.

11. The storage system according to claim 7 wherein the RAID controller is configured to manage a table logically representing the random distribution of the segments to storage devices in the RAID group, the table being stored in a computer memory.

12. The storage system according to claim 7 wherein the RAID controller is configured for generating the randomization table to:
generate a table comprising n columns and m rows; wherein n is equal to the number of segments in a RAID stripe and wherein m is equal to or smaller than the number of RAID stripes in the RAID group;

generate, for each row, a randomly ordered sequence of integers; and store the randomly ordered sequence of integers in the row.

13. The storage device system according to claim 7 is a Solid State Drive storage device.

14. A non-transitory program storage device readable by a computer, tangibly embodying a computer readable code portion executable by the computer to perform a method of allocating segments in a RAID stripe to respective storage devices in a corresponding RAID group; each RAID stripe comprises a group of data segments arranged in a first subset of data segments and a second subset of data segments; the first subset is protected by a first type-1 syndrome segment, the second subset is protected by a second type-1 syndrome segment and the entire group of data segments is protected by a type-2 syndrome segment; the method comprising:

generating a randomized distribution scheme for randomly distributing the data segments and syndrome segments in a RAID stripe to respective storage devices in the RAID group, including:

generating a randomization table, wherein each row in the randomization table comprises a sequence of integers in random order, the sequence of integers in each row representing one possible randomized distribution of segments in a RAID stripe across storage devices in the RAID group, selecting a row from the randomization table, and distributing the segments in the RAID stripe to the storage devices in the RAID group based on a respective sequence of integers in the selected row; and, responsive to a need to write data to the RAID group:

generating at least one RAID stripe; and using the randomized distribution scheme for distributing the segments in the at least one RAID stripe to the storage devices in the RAID group, such that any two failed storage devices in the RAID group would have the same first probability (P) for being protected by the same type-1 syndrome segment and the same second probability (1-P) for each one of the two failed storage devices being protected by a different type-1 syndrome segment, irrespective of the relative location of the two failed storage devices.

* * * * *